(12) United States Patent
Sandborn et al.

(10) Patent No.: US 12,210,099 B2
(45) Date of Patent: *Jan. 28, 2025

(54) LIDAR SYSTEM BASED ON MULTI-CHANNEL LASER MODULE FOR SIMULTANEOUS BEAM SCANNING OF TARGET ENVIRONMENT

(71) Applicant: Aurora Operations, Inc., Pittsburgh, PA (US)

(72) Inventors: Phillip Sandborn, Mountain View, CA (US); Sen Lin, Mountain View, CA (US); James Ferrara, Mountain View, CA (US)

(73) Assignee: AURORA OPERATIONS, INC., Pittsburgh, PA (US)

( * ) Notice: Subject to any disclaimer, the term of this patent is extended or adjusted under 35 U.S.C. 154(b) by 833 days.

This patent is subject to a terminal disclaimer.

(21) Appl. No.: 17/054,250

(22) PCT Filed: May 10, 2019

(86) PCT No.: PCT/US2019/031785
§ 371 (c)(1),
(2) Date: Nov. 10, 2020

(87) PCT Pub. No.: WO2019/217860
PCT Pub. Date: Nov. 14, 2019

(65) Prior Publication Data
US 2021/0072385 A1 Mar. 11, 2021

Related U.S. Application Data

(60) Provisional application No. 62/669,801, filed on May 10, 2018, provisional application No. 62/669,803,
(Continued)

(51) Int. Cl.
*G01S 17/34* (2020.01)
*G01S 7/481* (2006.01)
(Continued)

(52) U.S. Cl.
CPC ............ *G01S 17/34* (2020.01); *G01S 7/4817* (2013.01); *G01S 7/491* (2013.01); *G01S 17/58* (2013.01); *G01S 17/95* (2013.01); *G01S 7/4815* (2013.01)

(58) Field of Classification Search
None
See application file for complete search history.

(56) References Cited

U.S. PATENT DOCUMENTS

2002/0105632 A1* 8/2002 Holton ................... H04B 10/64
356/28.5
2006/0203224 A1 9/2006 Sebastian et al.
(Continued)

FOREIGN PATENT DOCUMENTS

CN 101373217 A 2/2009
CN 105204030 A 12/2015
(Continued)

OTHER PUBLICATIONS

European Patent Office, Extended European Search Report, European Application No. 19799227.4-1206/3791206, International Application No. PCT/US2019031767, Notification Date: Feb. 24, 2022, 9 pages.
(Continued)

*Primary Examiner* — Hovhannes Baghdasaryan
(74) *Attorney, Agent, or Firm* — Dority & Manning, P.A.

(57) ABSTRACT

A FMCW LIDAR system for simultaneous beam scanning of the target environment. The system can include a photonics assembly couplable to a beam steering module. The photonics assembly is configured to receive a frequency
(Continued)

modulated laser beam and can include an optical splitter and a coherent receiver. The optical splitter can be configured to optically split the frequency modulated laser beam into a local laser beam and a target laser beam, deliver the target laser beam to the beam steering module, and receive the target laser beam reflected by a target from the beam steering module. The coherent receiver can be configured to mix the local laser beam and the target laser beam to produce an output signal.

26 Claims, 10 Drawing Sheets

Related U.S. Application Data filed on May 10, 2018, provisional application No. 62/669,808, filed on May 10, 2018.

(51) Int. Cl.
  G01S 7/491 (2020.01)
  G01S 17/58 (2006.01)
  G01S 17/95 (2006.01)

(56) References Cited

U.S. PATENT DOCUMENTS

| | | | |
|---|---|---|---|
| 2015/0177367 A1 | 6/2015 | Sebastian et al. | |
| 2015/0198433 A1 | 7/2015 | Clair et al. | |
| 2016/0302010 A1 | 10/2016 | Sebastian et al. | |
| 2017/0350964 A1 | 12/2017 | Kaneda | |
| 2017/0356983 A1 | 12/2017 | Jeong et al. | |
| 2018/0100929 A1 | 4/2018 | O'Keeffe | |
| 2020/0182978 A1* | 6/2020 | Maleki | G01S 17/42 |

FOREIGN PATENT DOCUMENTS

| | | | |
|---|---|---|---|
| CN | 106687762 A | 5/2017 | |
| CN | 106707291 A | 5/2017 | |
| JP | 2008513145 A | 5/2008 | |
| JP | 2008536096 A | 9/2008 | |
| JP | 2012502301 A | 1/2012 | |
| JP | 2014202716 A | 10/2014 | |
| JP | 2015125062 A | 7/2015 | |
| JP | 2017161484 A | 9/2017 | |
| KR | 20110104950 A | 9/2011 | |
| WO | 03102625 A1 | 12/2003 | |
| WO | 2006/124939 A2 | 11/2006 | |
| WO | 2017187510 A1 | 11/2017 | |
| WO | 2018055449 A2 | 3/2018 | |
| WO | 2018/067158 A1 | 4/2018 | |

OTHER PUBLICATIONS

Office Action, European Application No. 19 726 834.5-1206, Notification Date: Jun. 24, 2022, 6 pages.
Office Action, European Application No. 19 727 207.3-1206, Notification Date: Jun. 27, 2022, 6 pages.
Office Action, Japanese Application No. 2021-513380, Notification Oct. 4, 2022, 3 pages.
Office Action, Japanese Application No. 2021-513379, Notification Date: Oct. 4, 2022, 3pages.
Office Action, Israel Application No. 278560, Notification Date: Nov. 8, 2022, 3 pages.
Office Action, Israel Application No. 278559, Notification Date: Nov. 24, 2022, 3 pages.
Gao et al., "Complex-optical-field lidar system for range and vector velocity measurement", Optical Society of America, vol. 20, No. 23, 2012, 9 pages.
International Search Report and Written Opinion of the International Searching Authority for International Application No. PCT/US2019/031785 mailed Jul. 24, 2019, 9 pages.
International Preliminary Report on Patentability of the International Searching Authority for International Application No. PCT/US2019/031785 mailed Nov. 10, 2020, 7 pages.
Yuesong, "Micro Doppler Effect and Its Application", Beijing University of Aeronautics and Astronautics Press, Aug. 2013, pp. 7-11.

* cited by examiner

LIDAR SYSTEM BASED ON MULTI-CHANNEL LASER MODULE FOR SIMULTANEOUS BEAM SCANNING OF TARGET ENVIRONMENT

CROSS-REFERENCE TO RELATED APPLICATIONS

This application claims priority under 35 U.S.C. § 119(e) to U.S. provisional patent application No. 62/669,803, titled LIDAR SYSTEM BASED ON COMPLEMENTARY MODULATION OF MULTIPLE LASERS AND COHERENT RECEIVER FOR SIMULTANEOUS RANGE AND VELOCITY MEASUREMENT, filed May 10, 2018; U.S. provisional patent application No. 62/669,801, titled LIDAR SYSTEM BASED ON LIGHT MODULATOR AND COHERENT RECEIVER FOR SIMULTANEOUS RANGE AND VELOCITY MEASUREMENT, filed May 10, 2018; and U.S. provisional patent application No. 62/669,808, titled LIDAR SYSTEM BASED ON MULTI-CHANNEL LASER MODULE FOR SIMULTANEOUS BEAM SCANNING OF TARGET ENVIRONMENT, filed May 10, 2018, each of which is hereby incorporated by reference herein in its entirety.

This application is also related to the following PCT applications, each of which is filed concurrently herewith and is herein incorporated by reference in its entirety: PCT/US2019/031767, titled LIDAR SYSTEM BASED ON LIGHT MODULATOR AND COHERENT RECEIVER FOR SIMULTANEOUS RANGE AND VELOCITY MEASUREMENT; and PCT/US2019/031778, titled LIDAR SYSTEM BASED ON COMPLEMENTARY MODULATION OF MULTIPLE LASERS AND COHERENT RECEIVER FOR SIMULTANEOUS RANGE AND VELOCITY MEASUREMENT.

BACKGROUND

The present disclosure is in the technical field of frequency-modulated continuous-wave (FMCW) light detection and ranging (LIDAR).

Generally, FMCW LIDAR systems sense range by measuring interference between optical signals from a local path and a target path. By sweeping the frequency of a laser, the interference signal becomes an oscillation with a frequency proportional to target distance. FMCW lasers may be modulated to have a linear frequency sweep from lower frequency to higher frequency, and then from higher frequency to lower frequency, in a triangular fashion.

Moving reflectors may cause a shift in the measured frequency proportional to the velocity of the reflector. To tell the difference between the effect of reflector's distance and velocity, one may measure the interference frequency during the positive laser sweep, and then the interference frequency during the negative frequency sweep.

The speed with which measurements are attained may be important, and the method of making two measurements to obtain velocity may take twice as long as the method of only measuring range. Thus, a method to use multiple frequency-modulated lasers with complementary frequency sweeps combined with a method to discriminate the complementary frequency sweeps may enhance the measurement speed of a distance and velocity LIDAR sensor. The method of discriminating the complementary frequency sweeps resolves ambiguity problems where the time delay and frequency shift effects cannot be sufficiently decoupled.

Further, generally, FMCW LIDAR systems use swept-source lasers to measure distance and velocity. The frequency of a reflected signal may be proportional to a target's distance. Moving targets shift a reflected signal's frequency proportional to the velocity of the target due to the Doppler effect, which can be measured simultaneously.

Beam steering modules may scan laser beams across a target environment. Having multiple laser channels in an optical system may involve several scanning elements to capture a larger field of view (FOV). A scheme that would allow several laser beams to share scanning elements may help reduce the complexity and cost of the system. It would further reduce cost of the system by implementing such scheme on integrated photonic chips.

SUMMARY

The present disclosure is an example multi-channel FMCW LIDAR system for simultaneous beam scanning of the target environment.

The multi-channel FMCW LIDAR uses lenses and a single beam steering module to scan the target scene with multiple light beams to get higher resolution given a certain frame rate.

The multi-channel FMCW LIDAR can be implemented on a single integrated photonic chip with multi-channel transceivers, where most of the discrete components are replaced with on-chip components. A coherent receiver module at the proximity of optical antennas eliminates the need of fiber circulators. Placing the photonic chip at the focal plane of a lens system generates multiple light beams pointing at different angle. A beam steering module scans all the beams simultaneously across the target environment.

FIGURES

DESCRIPTION

Figure 1:
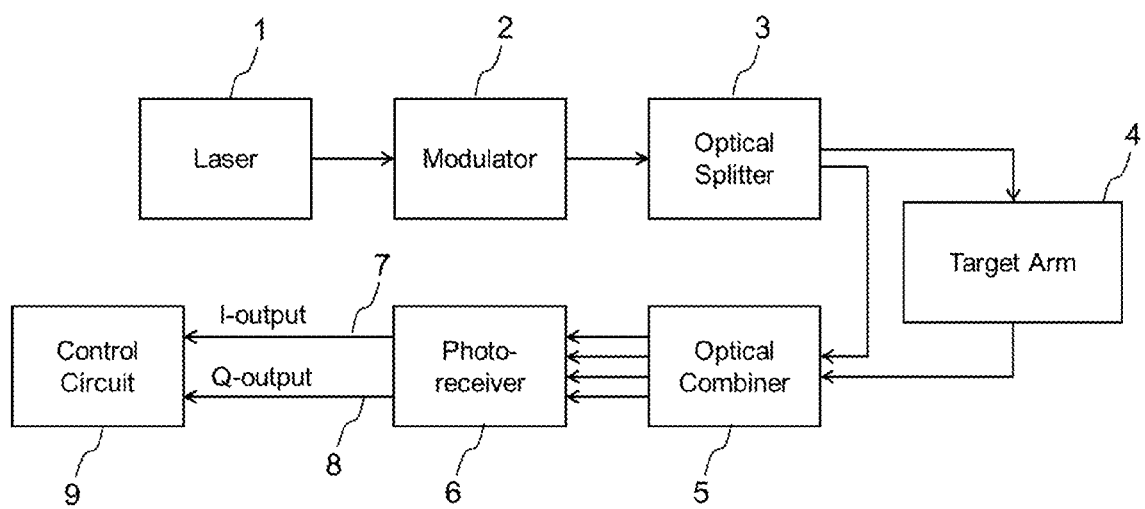
FIG. 1 is a diagram of the FMCW LIDAR system with modulation and detection, according to one aspect of the present disclosure.

Light Modulator and Coherent Receiver for Simultaneous Range and Velocity Measurement FIG. 1 is a block diagram showing an example of the FMCW LIDAR system, according to one aspect of the present disclosure. In this example, the system includes a laser 1 that is coupled to a laser modulator 2 (e.g., an optical intensity modulator). The laser modulator 2 is configured to modulate an intensity or an amplitude, for example, of a laser beam output by the laser 1. The system can further include a splitter 3 (e.g., a 2×2 splitter or coupler). Output light from the laser modulator 2 may be injected into the splitter 3, which is configured to separate the light into two paths (e.g., using a directional coupler or a multi-mode interferometer). The system can further include a combiner 5 (e.g., a 2×4 combiner or coupler). Some light generated by the laser 2 (as modulated by the laser modulator 2), may be directly coupled, via the splitter 3, to one input of the combiner 5. The rest of the light generated by the laser 2 may be transmitted, via the splitter 3, through the target path to a target arm 4 (examples of which are described below in connection with FIGS. 8A-8C) before being coupled to the other input of the combiner 5. In one aspect, the combiner 5 may be implemented as an "optical hybrid" or "90-degree optical hybrid," which is configured to split the light into four paths to be detected at a four-channel photoreceiver 6, also referred to as an "I-Q detector." An optical hybrid is configured to receive two optical signals (S and L) and, in response, generate four output signals: S+L, S−L, S+jL, S−jL (where j is the imaginary number). The output of the I-Q detector 6 may be in the form of two electrical signals: the I-channel 7 and the Q-channel 8. The system can further include a control circuit 9 coupled to the I-Q detector 6. The control circuit 9 can be configured to simultaneously process the I- and Q-channels 7, 8.

Figure 2:
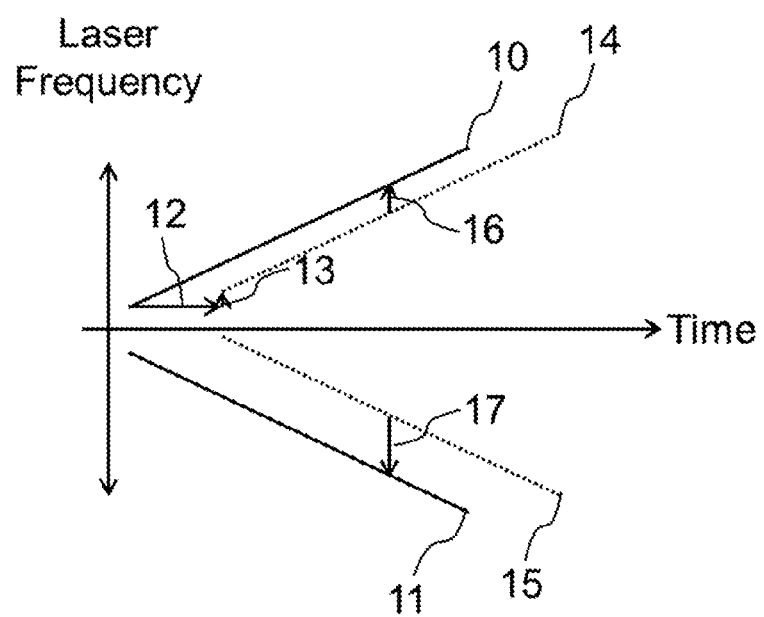
FIG. 2 is a graph illustrating laser frequency as a function of time for determining beat frequencies used to measure range and velocity simultaneously, according to one aspect of the present disclosure.

FIG. 2 is a graph illustrating laser frequency as a function of time illustrating an exemplary generation of signals at the output of the I-Q detector 6, according to one aspect of the present disclosure. In this example, the modulator 2 is configured to generate laser light with dual-sideband frequency modulation. In one aspect, the modulator 2 can be configured to directly transmit the upper sideband 10 and the lower sideband 11 to the combiner 5, which, as noted above, can be implemented as an optical hybrid. Further, the modulator 2 can also be configured to transmit the upper sideband 10 and the lower sideband 11 through the target path to be directed at the target, incurring both a time delay 12 due to the distance between the system and the target and a frequency shift 13 due to movement by the target before being received by the combiner 5. The received upper sideband 14 and the received lower sideband 15 can be combined with the transmitted upper sideband 10 and the transmitted lower side band 11 at the combiner 5. Interference between the transmitted and received upper sidebands 10, 14 may create a beat frequency equal to their separation 16 in laser frequency. Further, interference between the transmitted and received sidebands 11, 15 may likewise create a beat frequency equal to their separation 17 in laser frequency.

Figure 3:
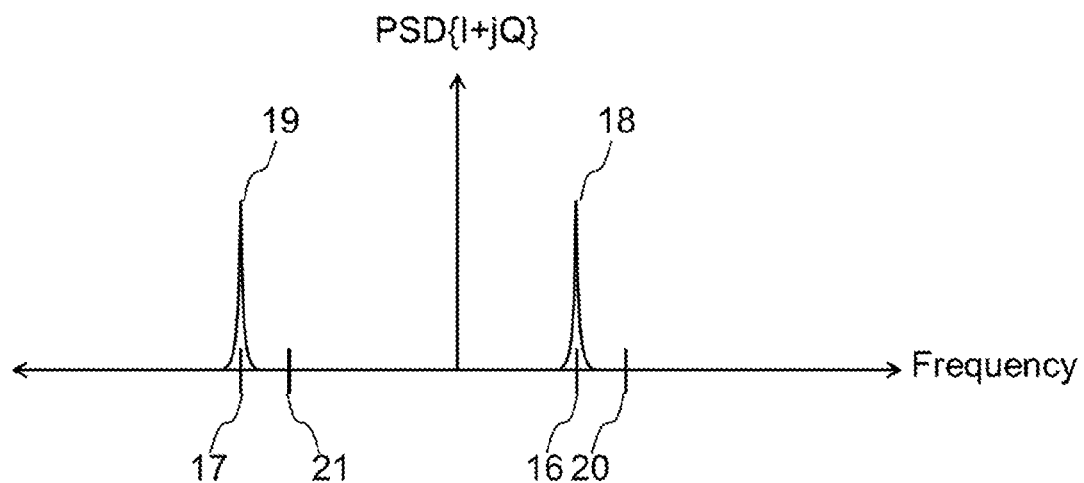
FIG. 3 is a graph illustrating power-spectral-density (PSD) measurements performed using the output channels of the photoreceiver as a function of frequency, according to one aspect of the present disclosure.

In this example, the I- and Q-channels 7, 8 generated by the combiner 5 can be summed to create the complex-valued signal I+jQ (where j is the imaginary number). The power spectral density (PSD) of this complex sum is illustrated in exemplary FIG. 3, which is a graph illustrating power-spectral-density (PSD) measurements performed using the output-channels of the I-Q detector as a function of frequency, according to one aspect of the present disclosure. The PSD measurements are processed (e.g., by the control circuit 9) to yield estimates for the range and velocity of the target without the need for successive measurements. The PSD may have a first peak value 18 at a first frequency value 16 (which is likewise indicated on FIG. 2) and a second peak value 19 at a second frequency value 17 (which is likewise indicated on FIG. 2). In this example, the first frequency value 16 is positive and the negative frequency value 17 is negative. The first frequency value 16 is shifted from a first nominal frequency value 20 (also referred to as the "nominal beat frequency"). The second frequency value 17 is shifted from a second nominal frequency value 21, which is the opposite sign of the first nominal frequency value 20. In one aspect, the control circuit 9 can be configured to calculate the nominal beat frequency 20 by subtracting the second frequency value 17 from the first frequency value 16 and dividing by two. Further, the control circuit 9 can be configured to calculate the frequency shift of the signals away from frequency value 20 by adding the first frequency value 16 and the second frequency value 17 and dividing by two. The nominal beat frequency 20 may be proportional to the target distance (i.e., the distance to the target from the emitter of the system), while the frequency shift may be proportional to the target velocity (i.e., the velocity at which the target is moving). If the target is moving in the opposite direction from the example shown in FIGS. 2 and 3, the measured peaks 18, 19 may be shifted in the opposite direction. This would thus lead to a differently signed value for the frequency shift, but the nominal beat frequency may still be calculated to be frequency value 20.

Figure 4:
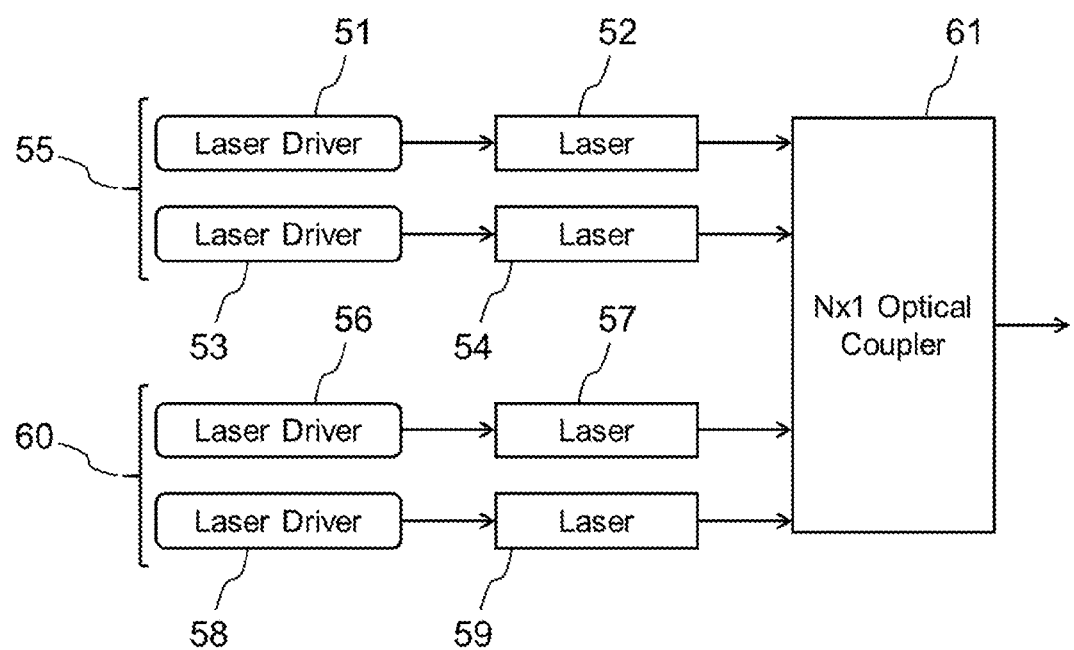
FIG. 4 is a diagram of a laser bank comprising N lasers and an Nx1 incoherent combiner, according to one aspect of the present disclosure.

Complementary Modulation of Multiple Lasers and Coherent Receiver for Simultaneous Range and Velocity Measurement FIG. 4 is a diagram of a laser bank comprising N lasers and an Nx1 incoherent combiner, according to one aspect of the present disclosure, which can be configured with as few as two lasers. In various aspects, N can be any integer>1. In the example, the system can include a first laser driver 51 that is coupled to and directly modulates a first laser 52. The system can further include a second laser driver 53 that is coupled to and directly modulates a second laser 54 independently from the first laser driver 51. This configuration may include a laser pair 55. The laser pair 55 may be repeated many times, as demonstrated by the second laser pair 60 in the particular example of the system shown in FIG. 4. Each laser may be coupled into a single waveguide via the Nx1 optical coupler 61. In one aspect, the first laser 52 may be modulated to emit laser beams having a positive frequency sweep and the second laser 54 may be simultaneously modulated to emit laser beams having a negative frequency sweep. The Nx1 optical coupler 61 can be configured to generate a laser field from each of the laser beams generated by the lasers 52, 54, 57, 59. The laser field generated from the laser beams having positive and negative frequency sweeps is then output by the laser bank.

Figure 5:
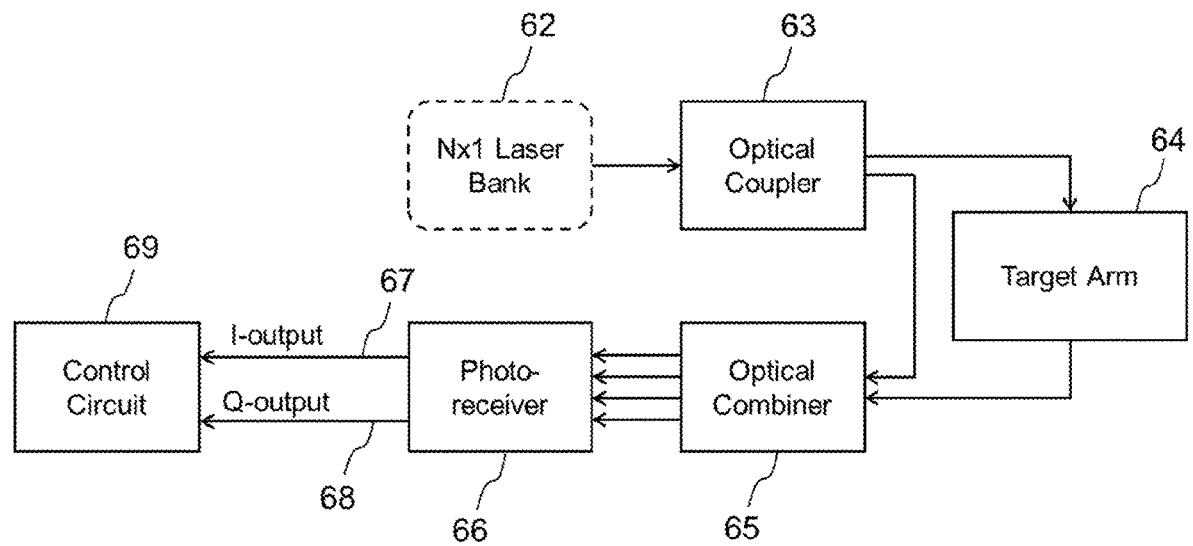
FIG. 5 is a diagram of the FMCW LIDAR system with an Nx1 laser bank and coherent detection, according to one aspect of the present disclosure.

FIG. 5 is a diagram of the FMCW LIDAR system with an Nx1 laser bank 62 and coherent detection, according to one aspect of the present disclosure. In this example, the system includes a laser bank 62 (also referred to as a "laser array"), such as the laser bank illustrated in FIG. 4. In one aspect, the system further includes an optical coupler 63 (e.g., a 2×2 optical coupler) coupled to the laser bank 62, which is configured to split the light (i.e., the laser field) from the laser bank 62 (e.g., using a directional coupler or a multimode interferometer). The system can further include a combiner 65 (e.g., a 2×4 combiner or coupler). Some or a portion of the light generated by the laser bank 62 may be may transmitted, via the coupler 63, through the target path to a target arm 64 (examples of which are described below in connection with FIGS. 8A-8C) before being coupled into the combiner 65. The rest or remaining portion of the light generated by the laser bank 62 may be directly coupled, via the coupler 63, into the combiner 65. In one aspect, the combiner 65 may be implemented as an "optical hybrid," which is configured to split the light into four paths to be detected at a four-channel photoreceiver 66, also referred to as an "I-Q detector." An optical hybrid is configured to receive two optical signals (S and L) and, in response, generate four output signals: S+L, S−L, S+jL, S−jL (where j is the imaginary number). The output of the I-Q detector 66 may be in the form of two electrical signals: the I-channel 67 and the Q-channel 68. The system can further include a control circuit 69 coupled to the I-Q detector 66. The control circuit 69 can be configured to simultaneously process the I- and Q-channels 67, 68.

Figure 6:
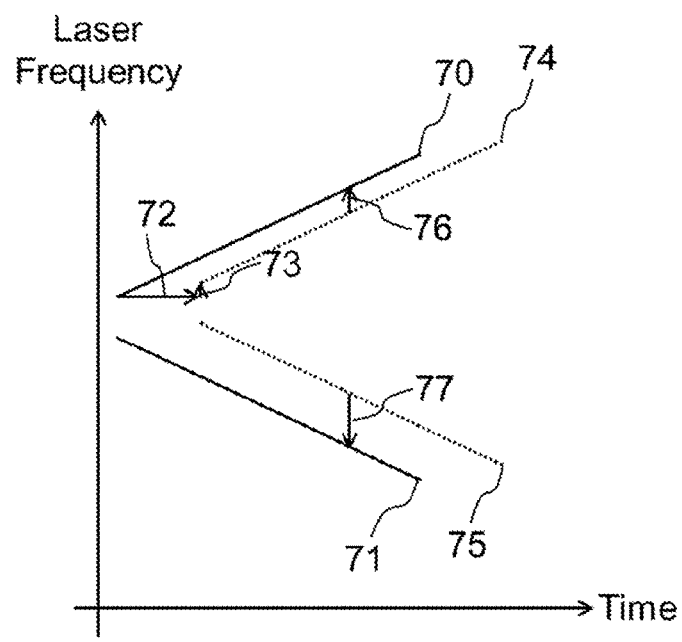
FIG. 6 is a graph illustrating laser frequency as a function of time for determining beat frequencies used to measure range and velocity simultaneously, according to one aspect of the present disclosure.

FIG. 6 is a graph illustrating laser frequency as a function of time illustrating an exemplary generation of signals at the output of the I-Q detector 66, according to one aspect of the present disclosure. Notably, FIG. 6 is similar to the graph depicted in FIG. 2; however, in this example, the laser bank 62 is configured to simultaneously generate two optical frequency sweeps. In one aspect, the coupler 63 can be configured to direct or transmit a first portion of the positive sweep 70 and the negative sweep 71 directly to the combiner 65, which, as noted above, can be implemented as an optical hybrid. Further, the coupler 63 can be configured to direct or transmit a second portion of the positive sweep 70 and the negative sweep 71 through the target path, incurring both a time delay 72 due to the distance between the system and the target and a frequency shift 73 due to movement by the target before being received by the combiner 65. The received positive sweep 74 and the received negative sweep 75 can be combined with the transmitted positive sweep 70 and the transmitted negative sweep 71 at the combiner 65. Interference between the transmitted and received positive sweeps 70, 74 may create a beat frequency equal to their separation in laser frequency 76. Further, interference between the transmitted and received negative sweeps 71, 75 may likewise create a beat frequency equal to their separation 77 in laser frequency.

Figure 7:
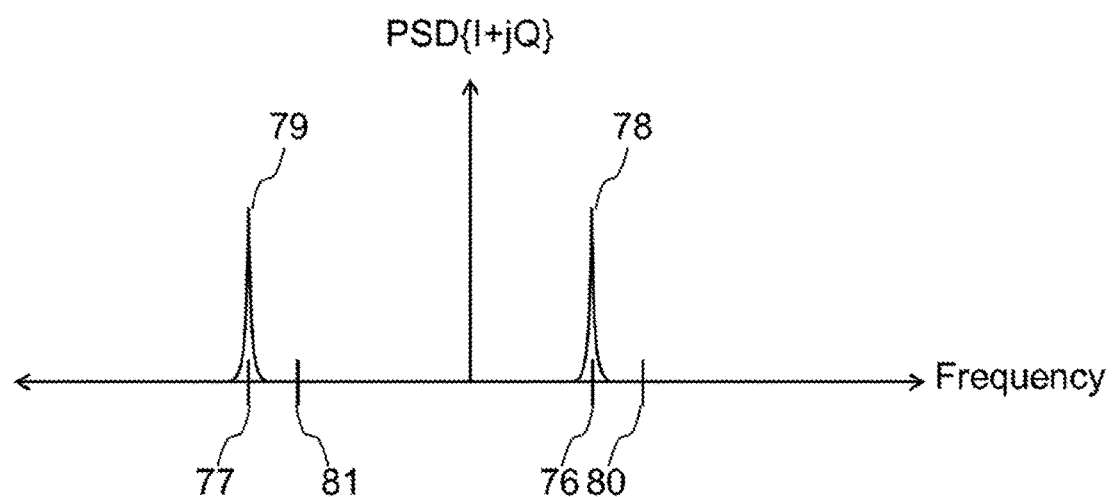
FIG. 7 is a graph illustrating power-spectral-density (PSD) measurements performed using the output channels of the photoreceiver as a function of frequency, according to one aspect of the present disclosure.

In this example, the I- and Q-channels 67, 68 generated by the combiner 65 can be summed to create the complex-valued signal, I+j Q (where j is the imaginary number). The power spectral density (PSD) of this complex sum may be illustrated in exemplary FIG. 7, which is a graph illustrating power-spectral-density (PSD) measurements performed using the output-channels of the I-Q detector as a function of frequency, according to one aspect of the present disclosure. The PSD measurements are processed (e.g., by the control circuit 69) to yield estimates for the range and velocity of the target without the need for successive measurements. The PSD may have a first peak value 78 at a first frequency value 76 (which is likewise indicated on FIG. 6) and a second peak value 79 at a second frequency value 77 (which is likewise indicated on FIG. 6). In this example, the first frequency value 76 is positive and the negative frequency value 77 is negative. The first frequency value 76 is shifted from a first nominal frequency value 80 (also referred to as the "nominal beat frequency"). The second frequency value 77 is shifted from a second nominal frequency value 81, which is the opposite sign of the first nominal frequency value 80. In one aspect, the control circuit 69 can be configured to calculate the nominal beat frequency 80 by subtracting the second frequency value 77 from the first frequency value 76 and dividing by two. Further, the control circuit 69 can be configured to calculate the frequency shift of the signals away from frequency value 80 by adding the first frequency value 76 and the second frequency value 77 and dividing by two. The nominal beat frequency 80 may be proportional to the target distance (i.e., the distance to the target from the emitter of the system), while the frequency shift may be proportional to the target velocity (i.e., the velocity at which the target is moving). If the target is moving in the opposite direction from the example shown in FIGS. 6 and 7, the measured peaks 78, 79 may be shifted in the opposite direction. This would thus lead to a differently signed value for the frequency shift, but the nominal beat frequency may still be calculated to be frequency value 70.

Target Arm Assemblies

Figure 8A:
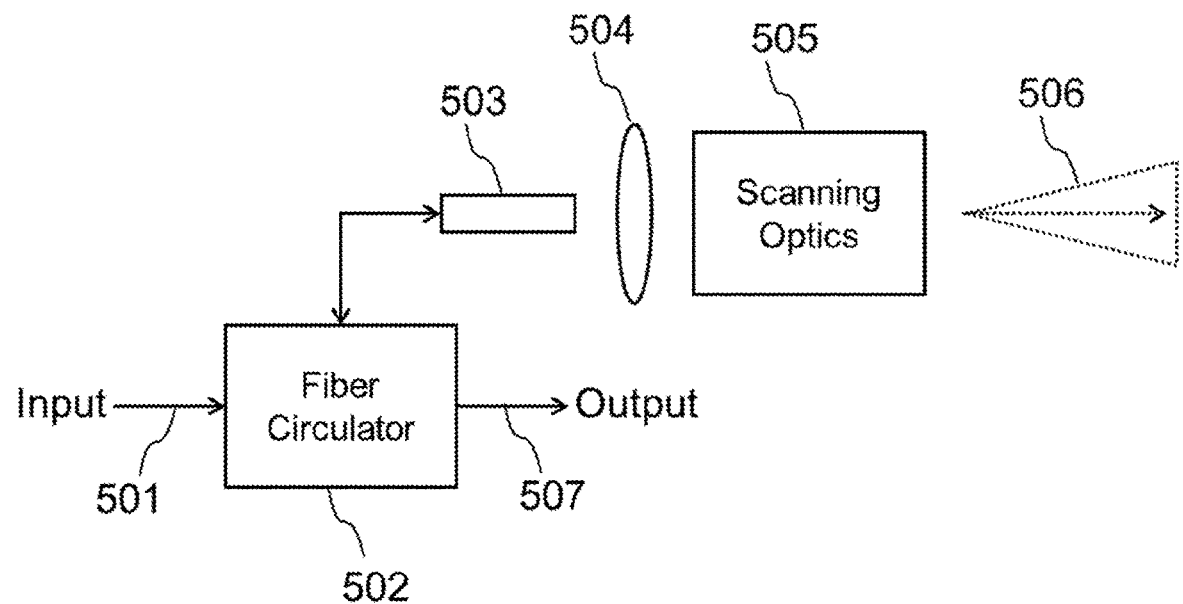
FIG. 8A is a diagram of a first implementation of the target arm of the interferometer, according to one aspect of the present disclosure.
Figure 8B:
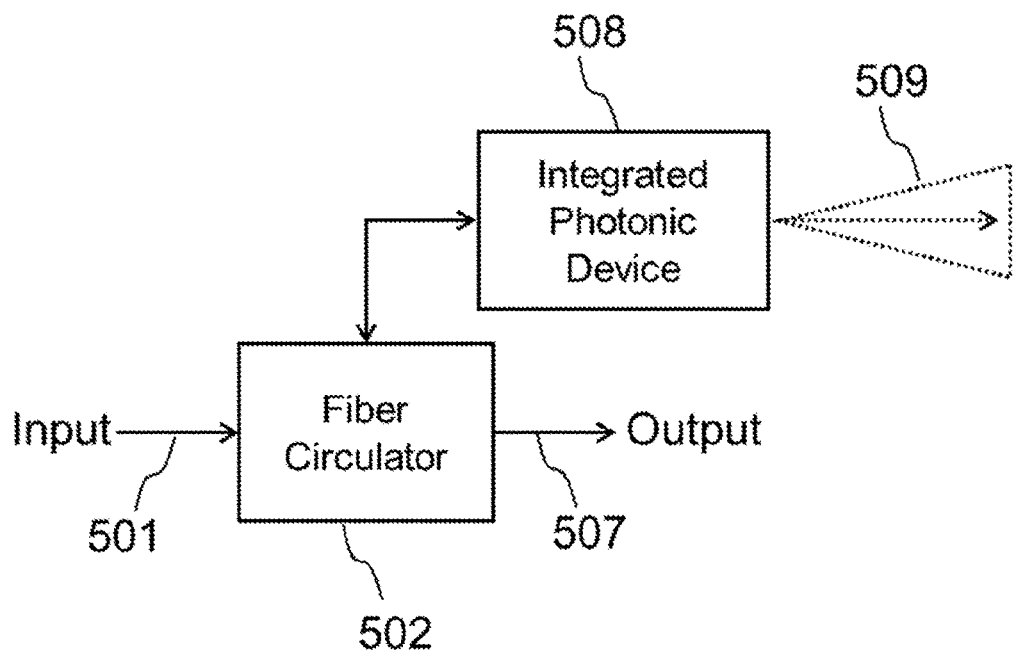
FIG. 8B is a diagram of a second implementation of the target arm of the interferometer, according to one aspect of the present disclosure.
Figure 8C:
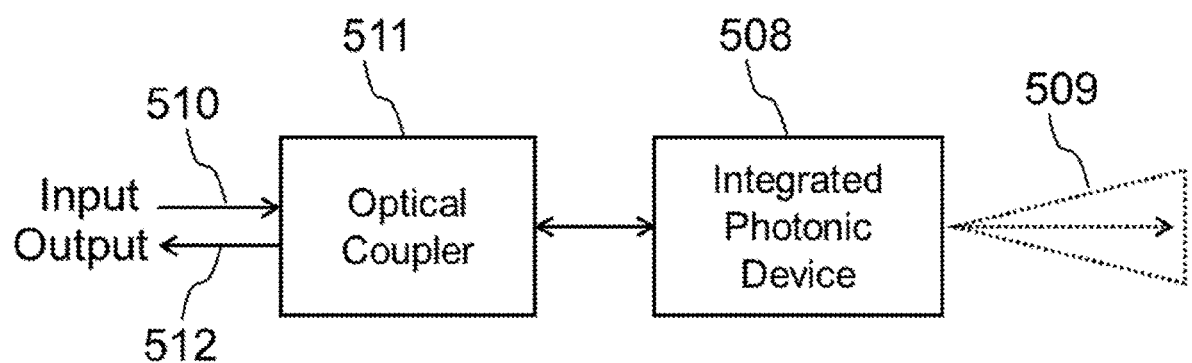
FIG. 8C is a diagram of a third implementation of the target arm of the interferometer, according to one aspect of the present disclosure.

FIGS. 8A-8C illustrate three illustrative implementations of a target arm, which can be utilized in conjunction with any of the systems described above in connection with FIGS. 1-7. In these various implementations, light can be coupled to a coaxial optical transceiver through discrete fiber components such as a fiber circulator or a 2×2 coupler (such as a directional coupler or multi-mode interferometer). Further, the light can be shaped and steered by a lens combined with mechanical scanning or light can be shaped and steered by an integrated photonic transceiver. Each example implementation illustrated in FIGS. 8A-8C includes a coaxial optical transceiver, where input light is coupled into scanning optics, transmitted to a target object, received by the same scanning optics, and delivered to the output of the target arm 4, 64. In a first example implementation of the target arm shown in FIG. 8A, input light is delivered to the input arm 501 of a fiber circulator 502. The first output light of the circulator 502 is delivered to a fiber facet 503 and the output beam is shaped by optics 504. The shaped beam is transmitted through scanning optics 505 (such as galvanometric scanning mirrors or MEMS-based scanning mirrors). The steered and shaped beam 506 is transmitted to a target that reflects some of the light. The scanning optics 505 can be used to receive the reflected light and the optics 504 can be used to focus the received light back into the fiber facet 503. Input light from the fiber facet 503 is delivered back to the fiber circulator 502 and coupled to the output 507 of the fiber circulator 502.

In a second example implementation of the target arm 4, 64 shown in FIG. 8B, the fiber circulator 502 output is delivered to an integrated photonic device 508 that shapes and directs an output beam 509 to the target. The same integrated photonic device 508 can be used to receive light reflected by the target and then deliver the received light back to the fiber circulator 502 such that the received light is coupled to the output 507 of the fiber circulator 502.

In a third example implementation of the target arm 4, 64 shown in FIG. 8C, input light is delivered to the input arm 510 of an optical coupler 511 (e.g., a 2×2 coupler). The output of the 2×2 coupler 511 is delivered to an integrated photonic device 508 that shapes and directs an output beam 509 to the target. The same integrated photonic device 508 can be used to receive light reflected by the target and then deliver the received light back to the 2×2 coupler 511 such that the received light is coupled to the output 512 of the 2×2 coupler 511. In one aspect, the 2×2 coupler 511 can be implemented as, for example, a fiber coupled module or as an integrated photonic component (such as directional coupler or multi-mode interferometer), which can be fabricated in tandem with the integrated photonic device 508.

Multi-Channel Frequency Modulated Continuous Wave LIDAR System

Figure 9:
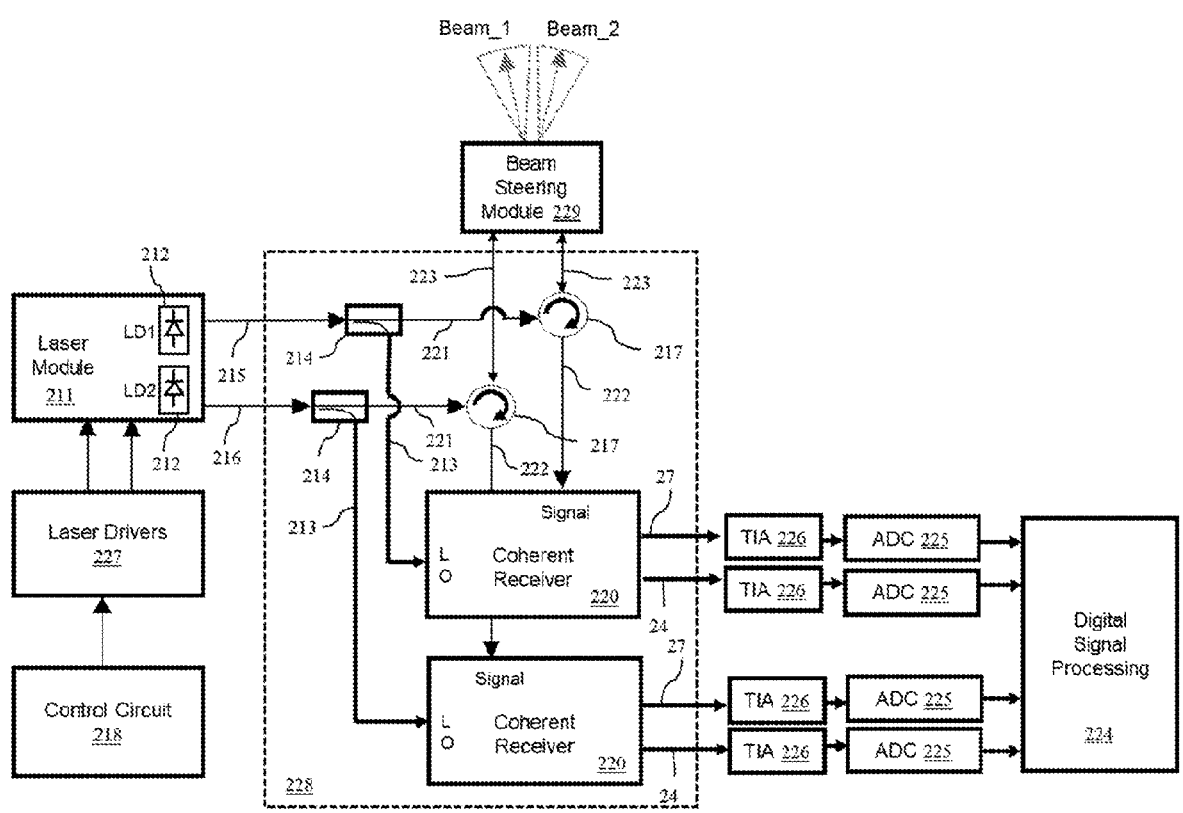
FIG. 9 is a diagram of a multi-channel FMCW LIDAR system, according to one aspect of the present disclosure.

FIG. 9 is a diagram of an example multi-channel FMCW LIDAR system, according to one aspect of the present disclosure. In one aspect, the system can include a laser module 211 with N laser diodes 212, where N is an integer≥2, coupled to a photonics assembly 228. In the illustrated example, the system includes a single pair of laser diodes 212 (i.e., N=2). In the following description, the system will be discussed primarily in terms of have two or a pair of laser diodes 212; however, this is merely for brevity and should be understood to not be limiting. In one aspect, the system further includes laser drives 227 coupled to the laser module 211 for generating laser beams therefrom and a control circuit 218 coupled to the laser drivers 227. In this example, the lasers diodes 212 are modulated by signals from the laser drivers 227, which are in turn controlled by the control circuit 218 to generate a frequency-swept waveform from each of the laser diodes 212. The two outputs from the laser diodes 212 run separate, but identical, paths 215, 216, where each path 215, 216 includes an interferometer structure for frequency measurement. The system further includes an optical power tap 214 (which can also be referred to as an "optical splitter") coupled to each path 215, 216. The optical power tap 214 is configured to direct the light output received from the laser diodes 212 along a "target" path 221 (at a first port of the optical power tap 214) leading to the beam steering module 229 (and indirectly to the coherent receiver 220) and a "local" path 213 (at a second port of the optical power tap 214). In the illustrated aspect, the target path 221 comprises an optical circulator 217. In other aspects, the target path 221 can include a directional coupler instead of the optical circulator 217. The optical circulator 217 (or directional coupler) is configured to direct outgoing beams 223 to a beam steering module 229 and direct returning beams 222 to the signal port of a coherent receiver 220. In the illustrated aspect, the local path 213 leads directly to the local oscillator (LO) port of the coherent receiver 220. Therefore, each coherent receiver 220 is configured to receive a first or target laser beam reflected from the target and a second or local laser beam directly from the laser module 211 generated from a respective laser diode 212 of the laser module 211. In one aspect, each combination of an optical power tap 214, a circulator 217, and a respective coherent receiver 220 can be collectively referred to as an "optical system." Although the photonics assembly 228 illustrated in FIG. 9 includes two optical systems, this is merely illustrative and the photonics assembly 228 can include n optical systems, where n is an integer>0.

Figure 11A:
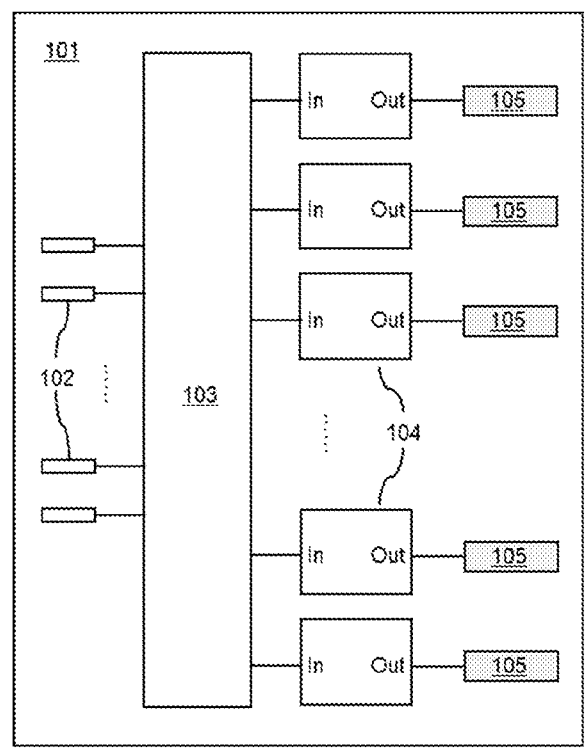
FIG. 11A is a diagram of the multi-channel FMCW LIDAR transceiver system implemented on an integrated photonic chip, according to one aspect of the present disclosure.
Figure 11B:
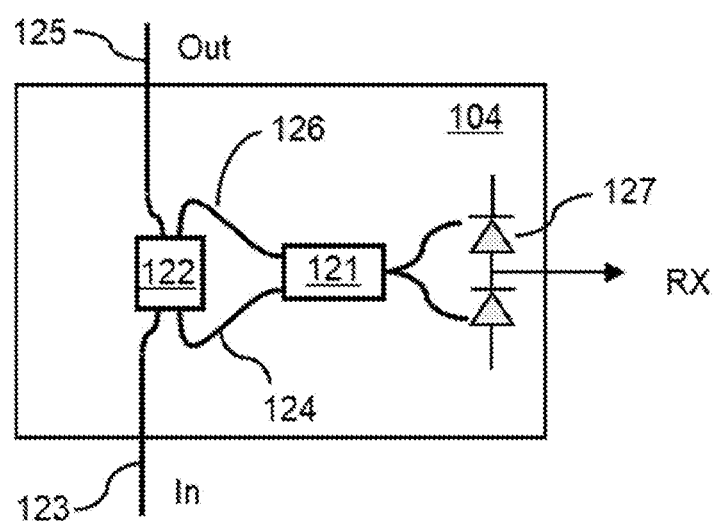
FIG. 11B is a diagram of a first example of a coherent receive utilized in the system illustrated in FIG. 11A, according to one aspect of the present disclosure.

In the aspect of the system illustrated in FIG. 9, the coherent receiver 220 can be configured to generate two electrical signals by mixing the two optical signals (i.e., the returning beam 222 and the local beam deliver via the local path 213) via an optical hybrid structure and feeding the optical signals to two pairs of balanced photodiodes, referred to as the "I-channel" 24 and the "Q-channel" 27. In an alternative aspect of the system, the coherent receiver 220 can be configured to generate a single electrical signal by mixing the two optical signals via an optical coupler and feeding to a single pair of balanced photodiodes. An example of such a coherent receiver 220 is illustrated in FIG. 11B and described below. These signals may be amplified by transimpedance amplifiers (TIAs) 226, digitized by analog-to-digital converters (ADCs) 225, and processed simultaneously through digital signal processing (DSP) 224 on or via a control circuit. The separate, but identical, paths 215, 216 lead to Beam_1 and Beam_2, respectively, at the beam steering module 229. All or part of the components, modules, and/or circuits of the photonics assembly 228 can be implemented on an integrated photonic chip including, but not limited to, silicon photonic chips or planar lightwave circuits (PLC), such as the chips illustrated in FIGS. 11A-12B.

Figure 10A:
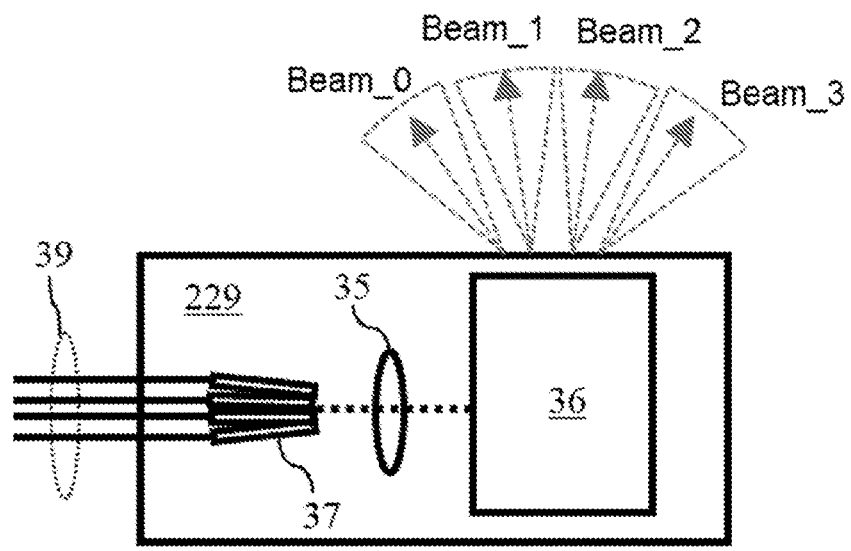
FIG. 10A is a diagram of a first example of a beam steering module where a single scanner directs multiple laser beams, according to one aspect of the present disclosure.
Figure 10B:
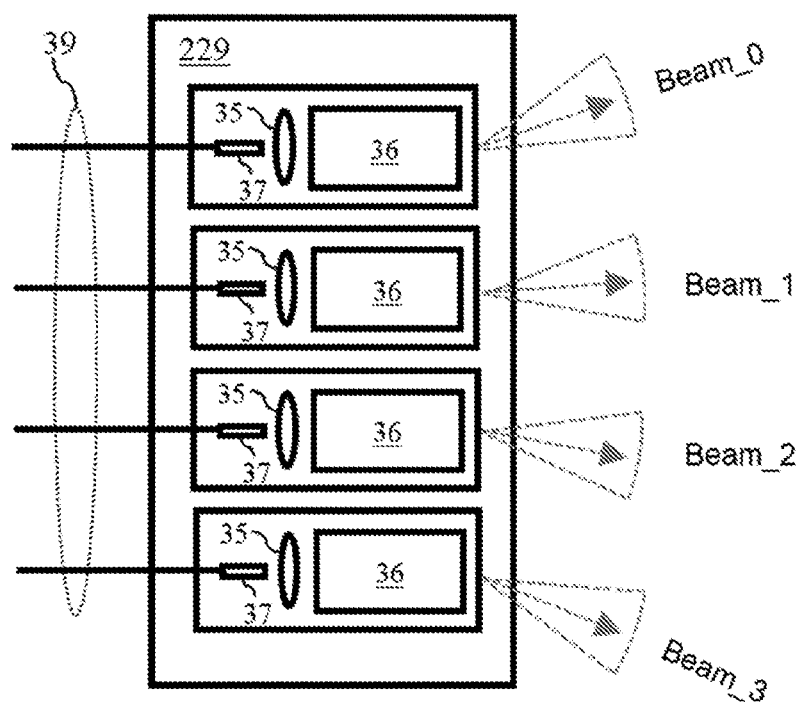
FIG. 10B is a diagram of a second example of a beam steering module where multiple scanners direct the laser beams, according to one aspect of the present disclosure.

FIGS. 10A and 10B illustrates two examples of alternative arrangements for the beam steering module 229, according to various aspects of the present disclosure. In this aspect shown in FIG. 10A, the beam steering module 229 comprises a bundle of free-space interfaces 37 configured to receive the laser beams arriving from the circulator 39 of the photonics assembly 228 (FIG. 9). The beam steering module 229 further includes an optical lens system 35 that receives the laser beams from the free-space interfaces 37 and projects the laser beams onto a single beam scanner 36. With the aid of the optical lens system 35, the different beams may cover an extended FOV, in either 1- or 2-dimensions. In one aspect, the free-space interfaces 37 are placed at the focal plane of the optical lens system 35 and are configured to send and receive optical signals at the same angles or different angles.

In an alternative example shown in FIG. 10B, the beam steering module 229 comprises multiple free-space interfaces 37, multiple optical lens systems 35, and multiple beam scanners 36. In this aspect, laser beams arriving from the circulator 39 of the photonics assembly (FIG. 9) enter the beam steering module 229 and each passes through a free-space interface 37 into an optical lens systems 35, where the beams are projected onto multiple scanners 36 and aimed at the target environment in different directions to cover a large FOV in either 1- or 2-dimensions.

Figure 11C:
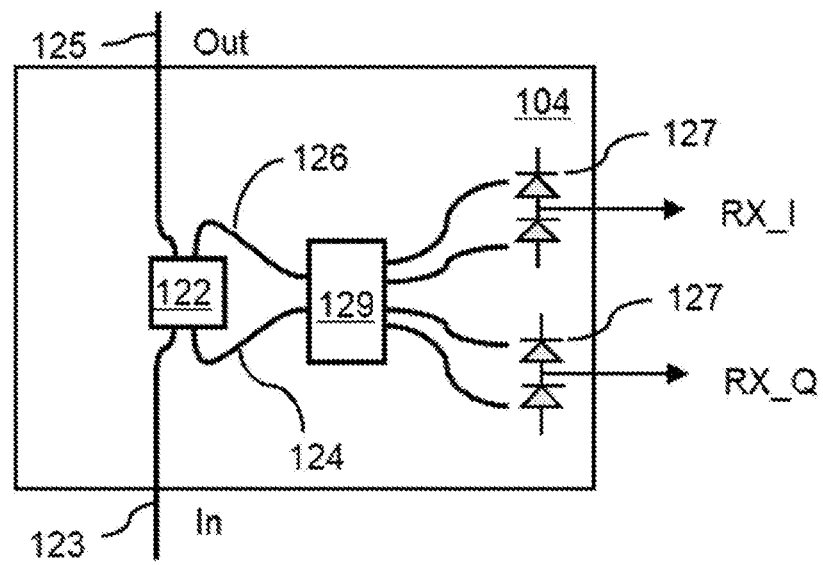
FIG. 11C is a diagram of a second example of a coherent receive utilized in the system illustrated in FIG. 11A, according to one aspect of the present disclosure.

The multi-channel architecture depicted in FIG. 9 and the beam steering modules 229 depicted in FIGS. 10A and 10B can be implemented on integrated photonic chips to significantly reduce the size and cost of the FMCW LIDAR system. FIG. 11A illustrates one implementation of an integrated photonic chip 101 with on-chip multichannel FMCW LIDAR transceivers. In one aspect, the integrated photonic chip 101 comprises a series of on-chip couplers 102 (e.g., edge couplers or surface grating couplers) that are configured to receive the frequency modulated light signals (e.g., as generated by the laser module 211 according to the laser drives 227) and distribute the light signals to parallel transceiver slices via an optical distribution network 103 (e.g., a binary tree structure). Each transceiver slice consists of a coherent receiver (CR) 104 and an optical antenna 105. FIGS. 11B and 11C shows two versions of a CR, for example. The optical distribution network 103 is configured to provide the received light (e.g., frequency modulated laser beams) to a first line 123 (i.e., the optical input) of the CR 104. The CR further includes a splitter 122 (e.g., a 2×2 bidirectional splitter) that is configured to split the light into a first output, which is directed through a second line 125, and a second output, which is directed through a third line 126. The second line 125 is coupled to the optical antenna 105; accordingly, the CR 104 is configured to direct the second output out of the chip using the optical antenna 105. Further, the optical antenna 105 is reciprocal and is thus configured to collect the reflected beam from the object (target) and send the reflected beam back to the CR 104 through the same line (i.e., the second line 125). The third line 126 corresponds to the LO for the CR 104. The splitter 122 is further configured to split the returned signal (i.e., the beam reflected from the target as received by the optical antenna 105) between the first line 123 and a fourth line 124. In the aspect illustrated in FIG. 11B, the third line 126 and the fourth line 124 are coupled to a balanced 2×2 121, which is configured to mix the transmitted optical signal (received via the third line 126) and the reflected optical signal (received via the fourth line 124). In the aspect illustrated in FIG. 11C, the third line 126 and the fourth line 124 are coupled to an optical hybrid 129. Further, the CR 104 includes photodiodes (PDs) 127 that are configured to convert an optical signal into an electrical signal for beat tone detection. For example, the aspect depicted in FIG. 11B includes a pair of PDs 127, whereas the aspect depicted in FIG. 11C includes four PDs 127. The aspect illustrated in FIG. 11B can be referred to as a "Balanced Photo Diode" (BPD) CR. The BPD CR is configured to provide a single electrical signal output. The aspect illustrated in FIG. 11C can be referred to as a "hybrid" CR. The hybrid CR is configured to provide in-phase (I) and quadrature (Q) outputs, which are used to determine the sign of the velocity from the Doppler shift in the measured beat tone.

Figure 12A:
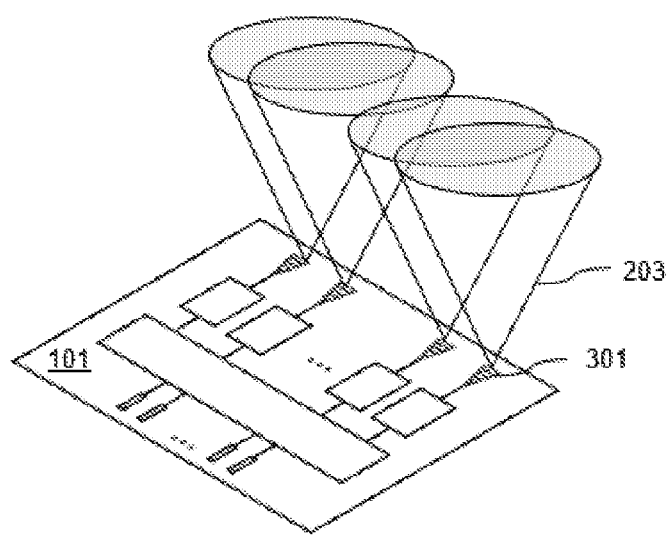
FIG. 12A is a diagram of an integrated photonic chip configured to emit laser beams from on-chip antennas in a first direction, according to one aspect of the present disclosure.
Figure 12B:
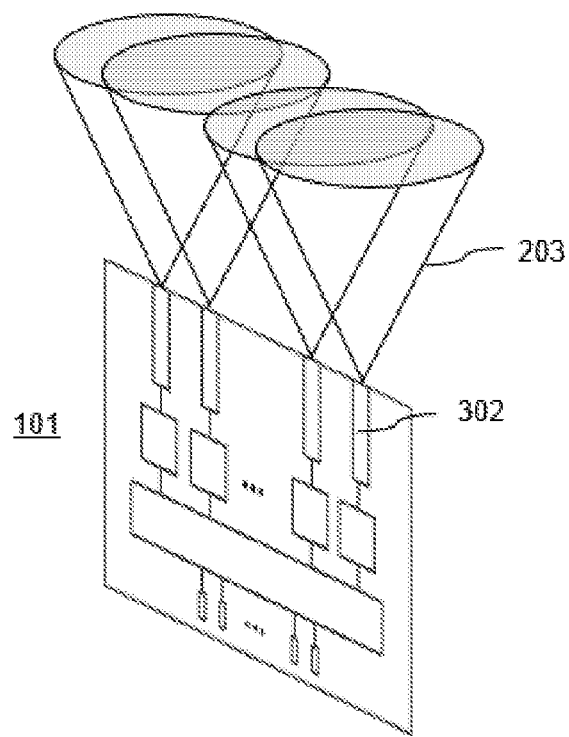
FIG. 12B is a diagram of an integrated photonic chip configured to emit laser beams from on-chip antennas in a second direction, according to one aspect of the present disclosure.

FIGS. 12A and 12B illustrate how various aspects of the integrated photonic chip 101 can be configured to emit and receive multiple light beams 203 depending on the type of optical antennas 105 (e.g., surface grating couplers 301 as shown in FIG. 12A or edge couplers 302 as shown in FIG. 12B). In various aspects, mode field convertors can be used as part of the antennas 105 to shape the divergence angle of the multiple light beams 203. The exit angle of the light beams can be the same or different depending on the lens system 202 design.

Figure 13:
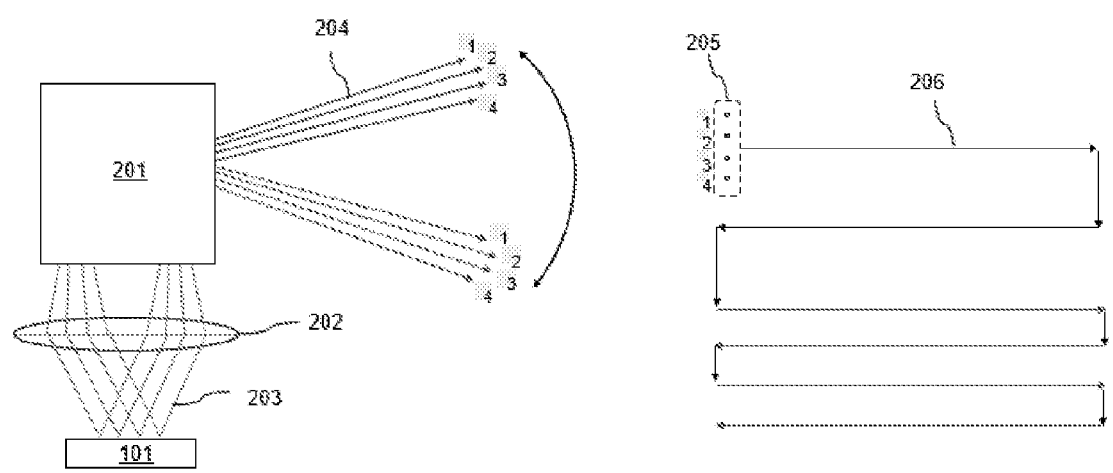
FIG. 13 is a diagram of a beam steering module arrangement and scanning patterns for the multi-channel FMCW LIDAR system implemented on an integrated photonic chip, according to one aspect of the present disclosure.

FIG. 13 is a diagram of a beam steering module arrangement and scanning patterns for the multi-channel FMCW LIDAR system implemented on an integrated photonic chip, according to one aspect of the present disclosure. In FIG. 13, a lens system 202 is configured to create collimated beams 204 pointing at different angles when the integrated photonics chip 101 (FIGS. 12A and 12B) is placed at its focal plane. A single-axis or dual-axis beam scanner 201 scans the light beams 204 across the entire FOV. In the depicted example, there are four beams 204, but this is merely for illustrative purposes and should not be interpreted to be limiting. Further, FIG. 13 depicts an example of a raster scan pattern in far field, where the four light spots 205 correspond to the four beams 204 are scanning together as a group in a scanning trajectory 206. Note that the scanning step of the raster scan can be non-uniform (e.g., denser at the center of the FOV) and be a fraction of angular span of the four points to address higher resolution requirement at the center.

EXAMPLES

Various aspects of the subject matter described herein are set out in the following numbered examples:

Example 1. A LIDAR system for determining a distance and a velocity of a target, the LIDAR system comprising: a laser configured to output a laser beam; a laser modulator coupled to the laser, the laser modulator configured to modulate an intensity of the laser beam; an optical combiner; an optical splitter coupled to the laser modulator, the optical splitter configured to: optically split the modulated laser beam into a first laser beam and a second laser beam; and direct the first laser beam at the target such that the first laser beam is reflected by the target to the optical combiner; wherein the optical combiner is configured to: receive the first laser beam reflected from the target; receive the second laser beam directly from the optical splitter; and optically combine the first laser beam and the second laser beam; a photoreceiver coupled to the optical combiner, the photoreceiver configured to output an I-output and a Q-output according to the optically combined first laser beam and second laser beam; and a control circuit coupled to the photoreceiver, the control circuit configured to: determine a power spectral density (PSD) according to the I-output and the Q-output; determine a first peak PSD at a positive frequency value; determine a second peak PSD at a negative frequency value; determine a nominal beat frequency according to a difference between the positive frequency value and the negative frequency value; and determine a frequency shift from the nominal beat frequency according to a sum of the positive frequency value and the negative frequency value; wherein the distance of the target corresponds to the nominal beat frequency; wherein the velocity of the target corresponds to the frequency shift.

Example 2. The LIDAR system of Example 1, wherein the photoreceiver comprises an I-Q detector.

Example 3. The LIDAR system of Examples 1 or 2, wherein the laser modulator is configured to frequency modulate the laser beam output by the laser.

Example 4. The LIDAR system of any one of Examples 1-3, wherein the optical combiner comprises an optical hybrid configured generate four output signals: S+L, S−L, S+jL, S−jL based on input signals S and L.

Example 5. The LIDAR system of Example 4, wherein the photoreceiver comprises a four-channel photoreceiver configured to receive each of the output signals of the optical hybrid.

Example 6. The LIDAR system of any one of Examples 1-5, wherein the optical splitter comprises a 2×2 coupler.

Example 7. The LIDAR system of any one of Examples 1-6, further comprising a target arm assembly coupled to the optical splitter, the target arm assembly configured to direct the first laser beam at the target and direct the reflected first laser beam to the optical combiner.

Example 8. The LIDAR system of Example 7, wherein the target arm assembly comprises: a circulator configured to: receive the first laser beam from the optical splitter; and direct the reflected first laser beam to the optical combiner; and scanning optics coupled to the circulator, the scanning optics configured to: receive the first laser beam from the circulator; direct the first laser beam at a target; receive the reflected first laser beam from the target; and direct the reflected first laser beam to the circulator.

Example 9. The LIDAR system of Example 8, wherein the scanning optics is selected from the group consisting of galvanometric scanning mirrors or MEMS-based scanning mirrors.

Example 10. The LIDAR system of Example 7, wherein the target arm assembly comprises: a circulator configured to: receive the first laser beam from the optical splitter; and direct the reflected first laser beam to the optical combiner; and an integrated photonic device coupled to the circulator, the integrated photonic device configured to: receive the first laser beam from the circulator; direct the first laser beam at a target; receive the reflected first laser beam from the target; and direct the reflected first laser beam to the circulator.

Example 11. The LIDAR system of Example 7, wherein the target arm assembly comprises: a 2×2 coupler configured to: receive the first laser beam from the optical splitter; and direct the reflected first laser beam to the optical combiner; and an integrated photonic device coupled to the 2×2 coupler, the integrated photonic device configured to: receive the first laser beam from the 2×2 coupler; direct the first laser beam at a target; receive the reflected first laser beam from the target; and direct the reflected first laser beam to the 2×2 coupler.

Example 12. A method for determining a distance and a velocity of a target via a LIDAR system, the method comprising: generating, by a laser, a laser beam; modulating, by a laser modulator, the laser beam; optically splitting, by an optical splitter, the modulated laser beam into a first laser beam and a second laser beam; directing, by the optical splitter, the first laser beam at the target such that the first laser beam is reflected by the target to an optical combiner; receiving, by the optical combiner, the first laser beam reflected from the target; receiving, by the optical combiner, the second laser beam directly from the optical splitter; optically combining, by the optical combiner, the reflected first laser beam and the second laser beam; outputting, by a photoreceiver, an I-output and a Q-output according to the optically combined reflected first laser beam and second laser beam; determining, by a control circuit coupled to the photoreceiver, a power spectral density (PSD) according to the I-output and the Q-output; determining, by the control circuit, a first peak PSD at a positive frequency value; determining, by the control circuit, a second peak PSD at a negative frequency value; determining, by the control circuit, a nominal beat frequency according to a difference between the positive frequency value and the negative frequency value; and determining, by the control circuit, a frequency shift from the nominal beat frequency according to a sum of the positive frequency value and the negative frequency value; wherein the distance of the target corresponds to the nominal beat frequency; wherein the velocity of the target corresponds to the frequency shift.

Example 13. The method of Example 12, wherein the photoreceiver comprises an I-Q detector.

Example 14. The method of Examples 12 or 13, wherein the laser modulator is configured to frequency modulate the laser beam output by the laser.

Example 15. The method of any one of Examples 12-14, wherein the optical combiner comprises an optical hybrid configured generate four output signals: S+L, S−L, S+jL, S−jL based on input signals S and L.

Example 16. The method of Example 15, wherein the photoreceiver comprises a four-channel photoreceiver configured to receive each of the output signals of the optical hybrid.

Example 17. The method of any one of Examples 12-16, wherein the optical splitter comprises a 2×2 coupler.

Example 18. The method of any one of Examples 12-17, wherein the LIDAR system comprises a target arm assembly coupled to the optical splitter, the target arm assembly configured to direct the first laser beam at the target and direct the reflected first laser beam to the optical combiner.

Example 19. The method of Example 18, further comprising: receiving, by a circulator of the target arm assembly, the first laser beam from the optical splitter; directing, by the circulator, the reflected first laser beam to the optical combiner; receiving, by scanning optics of the target arm assembly, the first laser beam from the circulator; directing, by the scanning optics, the first laser beam at a target; receiving, by the scanning optics, the reflected first laser beam from the target; and directing, by the scanning optics, the reflected first laser beam to the circulator.

Example 20. The method of Example 19, wherein the scanning optics is selected from the group consisting of galvanometric scanning mirrors or MEMS-based scanning mirrors.

Example 21. The method of Example 18, further comprising: receiving, by a circulator of the target arm assembly, the first laser beam from the optical splitter; directing, by the circulator, the reflected first laser beam to the optical combiner; receiving, by an integrated photonic device of the target arm assembly, the first laser beam from the circulator; directing, by the integrated photonic device, the first laser beam at a target; receiving, by the integrated photonic device, the reflected first laser beam from the target; and directing, by the integrated photonic device, the reflected first laser beam to the circulator.

Example 22. The method of Example 18, further comprising: receiving, by a circulator of the target arm assembly, the first laser beam from the optical splitter; directing, by the circulator, the reflected first laser beam to the optical combiner; receiving, by a 2×2 coupler of the target arm assembly, the first laser beam from the circulator; directing, by the 2×2 coupler, the first laser beam at a target; receiving, by the 2×2 coupler, the reflected first laser beam from the target; and directing, by the 2×2 coupler, the reflected first laser beam to the circulator.

Example 23. A LIDAR system for determining a distance and a velocity of a target, the LIDAR system comprising: a laser bank comprising: a first laser configured to output a first laser beam having a positive frequency sweep; a second laser configured to output a second laser beam having a negative frequency sweep; wherein the laser bank is configured to generate a laser field from the first laser beam and the second laser beam; an optical combiner; an optical coupler coupled to the laser bank, the optical coupler configured to: direct a first portion of the laser field at the target such that the first portion of the laser field is reflected by the target to the optical combiner; and direct a second portion of the laser field directly at the optical combiner; wherein the optical combiner is configured to: receive the reflected first portion of the laser field; and optically combine the reflected first portion of the laser field and the second portion of the laser field; a photoreceiver coupled to the optical coupler, the photoreceiver configured to output an I-output and a Q-output according to the optically combined portions of the laser field; and a control circuit coupled to the photoreceiver, the control circuit configured to: determine a power spectral density (PSD) according to the I-output and the Q-output; determine a first peak PSD at a positive frequency value; determine a second peak PSD at a negative frequency value; determine a nominal PSD frequency according to a difference between the positive frequency value and the negative frequency value; and determine a frequency shift from the nominal PSD frequency according to a sum of the positive frequency value and the negative frequency value; wherein the distance of the target corresponds to the nominal PSD frequency; wherein the velocity of the target corresponds to the frequency shift.

Example 24. The LIDAR system of Example 23, wherein the photoreceiver comprises an I-Q detector.

Example 25. The LIDAR system of Examples 23 or 24, wherein the laser bank comprises an Nx1 incoherent coupler coupled to each of the first laser and the second laser.

Example 26. The LIDAR system of any one of Examples 23-25, wherein the optical combiner comprises an optical hybrid configured generate four output signals: S+L, S−L, S+jL, S−jL based on input signals S and L.

Example 27. The LIDAR system of Example 26, wherein the photoreceiver comprises a four-channel photoreceiver configured to receive each of the output signals of the optical hybrid.

Example 28. The LIDAR system of any one of Examples 23-27, wherein the optical coupler comprises a 2×2 coupler.

Example 29. The LIDAR system of any one of Examples 23-28, further comprising a target arm assembly coupled to the optical coupler, the target arm assembly configured to direct the first portion of the laser field at the target and direct the reflected first portion of the laser field to the optical combiner.

Example 30. The LIDAR system of Example 29, wherein the target arm assembly comprises: a circulator configured to: receive the first laser beam from the optical coupler; and direct the reflected first laser beam to the optical combiner; and scanning optics coupled to the circulator, the scanning optics configured to: receive the first laser beam from the circulator; direct the first laser beam at a target; receive the reflected first laser beam from the target; and direct the reflected first laser beam to the circulator.

Example 31. The LIDAR system of Example 30, wherein the scanning optics is selected from the group consisting of galvanometric scanning mirrors or MEMS-based scanning mirrors.

Example 32. The LIDAR system of Example 29, wherein the target arm assembly comprises: a circulator configured to: receive the first laser beam from the optical coupler; and direct the reflected first laser beam to the optical combiner; and an integrated photonic device coupled to the circulator, the integrated photonic device configured to: receive the first laser beam from the circulator; direct the first laser beam at a target; receive the reflected first laser beam from the target; and direct the reflected first laser beam to the circulator.

Example 33. The LIDAR system of Example 29, wherein the target arm assembly comprises: a 2×2 coupler configured to: receive the first laser beam from the optical coupler; and direct the reflected first laser beam to the optical combiner; and an integrated photonic device coupled to the 2×2 coupler, the integrated photonic device configured to: receive the first laser beam from the 2×2 coupler; direct the first laser beam at a target; receive the reflected first laser beam from the target; and direct the reflected first laser beam to the 2×2 coupler.

Example 34. The LIDAR system of any one of Examples 23-33, wherein: the first laser is further configured to output a third laser beam having a negative frequency sweep; and the second laser is further configured to output a fourth laser beam having a positive frequency sweep.

Example 35. A method for determining a distance and a velocity of a target via a LIDAR system, the method comprising: generating, by a laser bank, a first laser beam having a positive frequency sweep and a second laser beam having a negative frequency sweep; directing, by an optical coupler, a first portion of the laser field at the target such that the first portion of the laser field is reflected by the target to an optical combiner; receiving, by the optical combiner, the first portion of the laser field reflected from the target; receiving, by the optical combiner, a second portion of the laser field directly from the optical coupler; optically combining, by the optical combiner, the reflected first portion of the laser field and the second portion of the laser field; outputting, by a photoreceiver, an I-output and a Q-output according to the optically combined portions of the laser field; determining, by a control circuit coupled to the photoreceiver, a power spectral density (PSD) according to the I-output and the Q-output; determining, by the control circuit, a first peak PSD at a positive frequency value; determining, by the control circuit, a second peak PSD at a negative frequency value; determining, by the control circuit, a nominal beat frequency according to a difference between the positive frequency value and the negative frequency value; and determining, by the control circuit, a frequency shift from the nominal beat frequency according to a sum of the positive frequency value and the negative frequency value; wherein the distance of the target corresponds to the nominal beat frequency; wherein the velocity of the target corresponds to the frequency shift.

Example 36. The method of Example 35, wherein the photoreceiver comprises an I-Q detector.

Example 37. The method of Examples 35 or 36, wherein the laser bank comprises an Nx1 incoherent coupler coupled to each of the first laser and the second laser.

Example 38. The method of any one of Examples 35-37, wherein the optical combiner comprises an optical hybrid configured generate four output signals: S+L, S−L, S+jL, S−jL based on input signals S and L.

Example 39. The method of Example 38, wherein the photoreceiver comprises a four-channel photoreceiver configured to receive each of the output signals of the optical hybrid.

Example 40. The method of any one of Examples 35-39, wherein the optical coupler comprises a 2×2 coupler.

Example 41. The method of any one of Examples 35-40, wherein the LIDAR system comprises a target arm assembly coupled to the optical coupler, the target arm assembly configured to direct the first laser beam at the target and direct the reflected first laser beam to the optical combiner.

Example 42. The method of Example 41, further comprising: receiving, by a circulator of the target arm assembly, the first portion of the laser field from the optical coupler; directing, by the circulator, the reflected first of the laser field to the optical combiner; receiving, by scanning optics of the target arm assembly, the first portion of the laser field from the circulator; directing, by the scanning optics, the first portion of the laser field at a target; receiving, by the scanning optics, the reflected first portion of the laser field from the target; and directing, by the scanning optics, the reflected first portion of the laser field to the circulator.

Example 43. The method of Example 42, wherein the scanning optics is selected from the group consisting of galvanometric scanning mirrors or MEMS-based scanning mirrors.

Example 44. The method of Example 41, further comprising: receiving, by a circulator of the target arm assembly, the first portion of the laser field from the optical coupler; directing, by the circulator, the reflected first portion of the laser field to the optical combiner; receiving, by an integrated photonic device of the target arm assembly, the first portion of the laser field from the circulator; directing, by the integrated photonic device, the first portion of the laser field at a target; receiving, by the integrated photonic device, the reflected first portion of the laser field from the target; and directing, by the integrated photonic device, the reflected first portion of the laser field to the circulator.

Example 45. The method of Example 41, further comprising: receiving, by a circulator of the target arm assembly, the first portion of the laser field from the optical coupler; directing, by the circulator, the reflected first portion of the laser field to the optical combiner; receiving, by a 2×2 coupler of the target arm assembly, the first portion of the laser field from the circulator; directing, by the 2×2 coupler, the first portion of the laser field at a target; receiving, by the 2×2 coupler, the reflected first portion of the laser field from the target; and directing, by the 2×2 coupler, the reflected first portion of the laser field to the circulator.

Example 46. A photonics assembly couplable to a beam steering module, the photonics assembly comprising: an optical system configured to receive a frequency modulated laser beam, the optical system comprising: an optical splitter couplable to the beam steering module, the optical splitter configured to: optically split the frequency modulated laser beam into a local laser beam and a target laser beam; deliver the target laser beam to the beam steering module; and receive the target laser beam reflected by a target from the beam steering module; and a coherent receiver coupled to the optical splitter, the coherent receiver configured to: receive the local laser beam from the optical splitter; receive the reflected target laser beam from the optical splitter; and mix the local laser beam and the target laser beam to produce an output signal.

Example 47. The photonics assembly of Example 46, wherein the optical splitter comprises an optical power tap configured to optically split the frequency modulated laser beam into the local laser beam and the target laser beam.

Example 48. The photonics assembly of Examples 46 or 47, wherein the optical splitter comprises an optical circulator configured to: deliver the target laser beam to the beam steering module; receive the target laser beam reflected by a target from the beam steering module; and deliver the reflected target laser beam to the coherent receiver.

Example 49. The photonics assembly of any one of Examples 46-48, wherein the photonics assembly comprises an integrated photonic chip.

Example 50. The photonics assembly of any one of Examples 46-49, further comprising the beam steering module.

Example 51. The photonics assembly of Example 50, wherein the beam steering module further comprises: a beam scanner; and an optical lens system configured to: receive the target laser beam from the optical splitter; project the target laser beam to the beam scanner; receive the reflected target laser beam from the beam scanner; and direct the reflected target laser beam to the optical splitter.

Example 52. The photonics assembly of any one of Examples 46-49, wherein the optical system comprises a first optical system, the frequency modulated laser beam comprises a first frequency modulated laser beam, the optical splitter comprises a first optical splitter, and the coherent receiver comprises a first coherent receiver, the photonics assembly further comprising: a second optical system configured to receive a second frequency modulated laser beam simultaneously as the first frequency modulated laser beam is received by the first optical system, the second optical system comprising: a second optical splitter couplable to the beam steering module, the second optical splitter configured to: optically split the second frequency modulated laser beam into a second local laser beam and a second target laser beam; deliver the second target laser beam to the beam steering module; and receive the second target laser beam reflected by a target from the beam steering module; and a second coherent receiver coupled to the second optical splitter, the second coherent receiver configured to: receive the second local laser beam from the second optical splitter; receive the reflected second target laser beam from the second optical splitter; and mix the second local laser beam and the second target laser beam to produce a second output signal.

Example 53. The photonics assembly of Example 52, further comprising the beam steering module.

Example 54. The photonics assembly of Example 53, wherein the beam steering module further comprises: a beam scanner; and an optical lens system configured to: receive the first target laser beam and the second target laser beam from each of the first optical splitter and the second optical splitter; project the first target laser beam and the second target laser beam to the beam scanner; receive the reflected first target laser beam and the reflected second target laser beam from the beam scanner; and direct the reflected first target laser beam and the reflected second target laser beam to the first optical splitter and the second optical splitter, respectively.

Example 55. The photonics assembly of Example 53, wherein the beam steering module further comprises: a first beam scanner; a first optical lens system configured to: receive the first target laser beam from the first optical splitter; project the first target laser beam to the first beam scanner; receive the reflected first target laser beam from the first beam scanner; and direct the reflected first target laser beam to the first optical splitter; a second beam scanner; and a second optical lens system configured to: receive the second target laser beam from the second optical splitter; project the second target laser beam to the second beam scanner; receive the reflected second target laser beam from the second beam scanner; and direct the reflected second target laser beam to the second optical splitter.

Example 56. The photonics assembly of any one of Examples 46-55, wherein the output signal comprises an I-channel signal and a Q-channel signal.

Example 57. The photonics assembly of any one of Examples 46-56, wherein the coherent receiver comprises an optical hybrid.

Example 58. The photonics assembly of any one of Examples 46-56, wherein the coherent receiver comprises a pair of balanced photodiodes configured to output the output signal.

Example 59. A method for scanning a target environment via a photonics assembly comprising an optical system, the optical system comprising an optical splitter and a coherent receiver coupled to the optical splitter, the method comprising: receiving, by the optical system, a frequency modulated laser beam; optically splitting, by the optical splitter, the frequency modulated laser beam into a local laser beam and a target laser beam; delivering, by the optical splitter, the target laser beam to the beam steering module; receiving, by the optical splitter, the target laser beam reflected by a target from the beam steering module; receiving, by the coherent receiver, the local laser beam from the optical splitter; receiving, by the coherent receiver, the reflected target laser beam from the optical splitter; and mixing, by the coherent receiver, the local laser beam and the target laser beam to produce an output signal.

Example 60. The method of Example 59, wherein the optical splitter comprises an optical power tap configured to optically split the frequency modulated laser beam into the local laser beam and the target laser beam.

Example 61. The method of Examples 59 or 60, wherein the optical splitter comprises an optical circulator, the method further comprising: delivering, by the optical circulator, the target laser beam to the beam steering module; receiving, by the optical circulator, the target laser beam reflected by a target from the beam steering module; and delivering, by the optical circulator, the reflected target laser beam to the coherent receiver.

Example 62. The method of any one of Examples 59-61, wherein the photonics assembly comprises an integrated photonic chip.

Example 63. The method of any one of Examples 59-62, wherein the photonics assembly further comprises the beam steering module.

Example 64. The method of Example 63, wherein the beam steering module further comprises a beam scanner an optical lens system, the method further comprising: receiving, by the optical lens system, the target laser beam from the optical splitter; projecting, by the optical lens system, the target laser beam to the beam scanner; receiving, by the optical lens system, the reflected target laser beam from the beam scanner; and directing, by the optical lens system, the reflected target laser beam to the optical splitter.

Example 65. The method of any one of Examples 59-62, wherein the optical system comprises a first optical system, the frequency modulated laser beam comprises a first frequency modulated laser beam, the optical splitter comprises a first optical splitter, and the coherent receiver comprises a first coherent receiver, the method further comprising: receiving, by a second optical system, a second frequency modulated laser beam simultaneously as the first frequency modulated laser beam is received by the first optical system; optically splitting, by a optical splitter, the second frequency modulated laser beam into a second local laser beam and a second target laser beam; delivering, by the optical splitter, the second target laser beam to the beam steering module; receiving, by the optical splitter, the second target laser beam reflected by a target from the beam steering module; receiving, by a second coherent receiver, the second local laser beam from the second optical splitter; receiving, by the second coherent receiver, the reflected second target laser beam from the second optical splitter; and mixing, by the second coherent receiver, the second local laser beam and the second target laser beam to produce a second output signal.

Example 66. The method of Example 65, wherein the photonics assembly further comprises the beam steering module.

Example 67. The method of Example 66, wherein the beam steering module further comprises a beam scanner and an optical lens system, the method further comprising: receiving, by the optical lens system, the first target laser beam and the second target laser beam from each of the first optical splitter and the second optical splitter; projecting, by the optical lens system, the first target laser beam and the second target laser beam to the beam scanner; receiving, by the optical lens system, the reflected first target laser beam and the reflected second target laser beam from the beam scanner; and directing, by the optical lens system, the reflected first target laser beam and the reflected second target laser beam to the first optical splitter and the second optical splitter, respectively.

Example 68. The method of Example 66, wherein the beam steering module further comprises a first beam scanner, a first optical lens system, a second beam scanner, and a second optical lens system, the method further comprising: receiving, by the first optical lens system, the first target laser beam from the first optical splitter; projecting, by the first optical lens system, the first target laser beam to the first beam scanner; receiving, by the first optical lens system, the reflected first target laser beam from the first beam scanner; directing, by the first optical lens system, the reflected first target laser beam to the first optical splitter; receiving, by the second optical lens system, the second target laser beam from the second optical splitter; projecting, by the second optical lens system, the second target laser beam to the second beam scanner; receiving, by the second optical lens system, the reflected second target laser beam from the second beam scanner; and directing, by the second optical lens system, the reflected second target laser beam to the second optical splitter.

Example 69. The method of any one of Examples 59-68, wherein the output signal comprises an I-channel signal and a Q-channel signal.

Example 70. The method of any one of Examples 59-69, wherein the coherent receiver comprises an optical hybrid.

Example 71. The method of any one of Examples 59-70, wherein the coherent receiver comprises a pair of balanced photodiodes configured to output the output signal.

While several forms have been illustrated and described, it is not the intention of the applicant to restrict or limit the scope of the appended claims to such detail. Numerous modifications, variations, changes, substitutions, combinations, and equivalents to those forms may be implemented and will occur to those skilled in the art without departing from the scope of the present disclosure. Moreover, the structure of each element associated with the described forms can be alternatively described as a means for providing the function performed by the element. Also, where materials are disclosed for certain components, other materials may be used. It is therefore to be understood that the foregoing description and the appended claims are intended to cover all such modifications, combinations, and variations as falling within the scope of the disclosed forms. The appended claims are intended to cover all such modifications, variations, changes, substitutions, modifications, and equivalents.

The foregoing detailed description has set forth various forms of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, and/or examples can be implemented, individually and/or collectively, by a wide range of hardware, software, firmware, or virtually any combination thereof. Those skilled in the art will recognize that some aspects of the forms disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as one or more program products in a variety of forms, and that an illustrative form of the subject matter described herein applies regardless of the particular type of signal bearing medium used to actually carry out the distribution.

As used in any aspect herein, the term "control circuit" may refer to, for example, hardwired circuitry, programmable circuitry (e.g., a computer processor including one or more individual instruction processing cores, processing unit, processor, microcontroller, microcontroller unit, controller, digital signal processor (DSP), programmable logic device (PLD), programmable logic array (PLA), or field programmable gate array (FPGA)), state machine circuitry, firmware that stores instructions executed by programmable circuitry, and any combination thereof. The control circuit may, collectively or individually, be embodied as circuitry that forms part of a larger system, for example, an integrated circuit (IC), an application-specific integrated circuit (ASIC), a system on-chip (SoC), desktop computers, laptop computers, tablet computers, servers, smart phones, etc. Accordingly, as used herein "control circuit" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), and/or electrical circuitry forming a communications device (e.g., a modem, communications switch, or optical-electrical equipment). Those having skill in the art will recognize that the subject matter described herein may be implemented in an analog or digital fashion or some combination thereof.

As used in any aspect herein, the terms "component," "system," "module" and the like can refer to a computer-related entity, either hardware, a combination of hardware and software, software, or software in execution.

One or more components may be referred to herein as "configured to," "configurable to," "operable/operative to," "adapted/adaptable," "able to," "conformable/conformed to," etc. Those skilled in the art will recognize that "configured to" can generally encompass active-state components and/or inactive-state components and/or standby-state components, unless context requires otherwise.

The invention claimed is:

1. A photonics assembly couplable to a beam steering module, the photonics assembly comprising:
an optical system configured to receive a frequency modulated laser beam, the optical system comprising:
an optical splitter couplable to the beam steering module, the optical splitter configured to:
optically split the frequency modulated laser beam into a local laser beam and a target laser beam,
deliver the target laser beam to the beam steering module; and
receive the target laser beam reflected by a target from the beam steering module; and
a coherent receiver coupled to the optical splitter, the coherent receiver configured to:
receive the local laser beam from the optical splitter;
receive the reflected target laser beam from the optical splitter; and
mix the local laser beam and the target laser beam to produce an output signal, wherein the output signal comprises an I-channel output signal and a Q-channel output signal; and
a control circuit configured to substantially simultaneously process the I-channel output signal and the Q-channel output signal and configured to process power-spectral-density (PSD) measurements using the I-channel output signal and the Q-channel output signal as a function of frequency to determine estimation values for both a distance to the target and a velocity of the target.

2. The photonics assembly of claim 1, wherein the optical splitter comprises an optical power tap configured to optically split the frequency modulated laser beam into the local laser beam and the target laser beam.

3. The photonics assembly of claim 1, wherein the optical splitter comprises an optical circulator configured to:
deliver the target laser beam to the beam steering module;
receive the target laser beam reflected by a target from the beam steering module; and
deliver the reflected target laser beam to the coherent receiver.

4. The photonics assembly of claim 1, wherein the photonics assembly comprises an integrated photonic chip.

5. The photonics assembly of claim 1, further comprising the beam steering module.

6. The photonics assembly of claim 5, wherein the beam steering module further comprises:
a beam scanner; and
an optical lens system configured to:
receive the target laser beam from the optical splitter;
project the target laser beam to the beam scanner;
receive the reflected target laser beam from the beam scanner; and
direct the reflected target laser beam to the optical splitter.

7. The photonics assembly of claim 1, wherein the optical system comprises a first optical system, the frequency modulated laser beam comprises a first frequency modulated laser beam, the optical splitter comprises a first optical splitter, and the coherent receiver comprises a first coherent receiver, the photonics assembly further comprising:
a second optical system configured to receive a second frequency modulated laser beam simultaneously as the first frequency modulated laser beam is received by the first optical system, the second optical system comprising:
a second optical splitter couplable to the beam steering module, the second optical splitter configured to:
optically split the second frequency modulated laser beam into a second local laser beam and a second target laser beam;

deliver the second target laser beam to the beam steering module; and receive the second target laser beam reflected by a target from the beam steering module; and a second coherent receiver coupled to the second optical splitter, the second coherent receiver configured to:

receive the second local laser beam from the second optical splitter;

receive the reflected second target laser beam from the second optical splitter; and mix the second local laser beam and the second target laser beam to produce a second output signal.

8. The photonics assembly of claim 7, further comprising the beam steering module.

9. The photonics assembly of claim 8, wherein the beam steering module further comprises:

a beam scanner; and an optical lens system configured to:

receive the first target laser beam and the second target laser beam from each of the first optical splitter and the second optical splitter, project the first target laser beam and the second target laser beam to the beam scanner;

receive the reflected first target laser beam and the reflected second target laser beam from the beam scanner; and direct the reflected first target laser beam and the reflected second target laser beam to the first optical splitter and the second optical splitter, respectively.

10. The photonics assembly of claim 8, wherein the beam steering module further comprises:

a first beam scanner;

a first optical lens system configured to:

receive the first target laser beam from the first optical splitter;

project the first target laser beam to the first beam scanner;

receive the reflected first target laser beam from the first beam scanner; and direct the reflected first target laser beam to the first optical splitter;

a second beam scanner; and a second optical lens system configured to:

receive the second target laser beam from the second optical splitter;

project the second target laser beam to the second beam scanner;

receive the reflected second target laser beam from the second beam scanner; and direct the reflected second target laser beam to the second optical splitter.

11. The photonics assembly of claim 1, wherein the PSD measurements include a first peak value at a first frequency value and a second peak value at a second frequency value, the control circuit is configured to:

determine a nominal beat frequency based on a difference between the first frequency value and the second frequency value, and to determine the distance to the target based on the nominal beat frequency.

12. The photonics assembly of claim 1, wherein the coherent receiver comprises an optical hybrid.

13. The photonics assembly of claim 1, wherein the coherent receiver comprises a pair of balanced photodiodes configured to output the output signal.

14. A method for scanning a target environment via a photonics assembly comprising an optical system, the optical system comprising an optical splitter and a coherent receiver coupled to the optical splitter, the method comprising:

receiving, by the optical system, a frequency modulated laser beam;

optically splitting, by the optical splitter, the frequency modulated laser beam into a local laser beam and a target laser beam;

delivering, by the optical splitter, the target laser beam to the beam steering module;

receiving, by the optical splitter, the target laser beam reflected by a target from the beam steering module;

receiving, by the coherent receiver, the local laser beam from the optical splitter;

receiving, by the coherent receiver, the reflected target laser beam from the optical splitter;

mixing, by the coherent receiver, the local laser beam and the target laser beam to produce an output signal, wherein the output signal comprises an I-channel output signal and a Q-channel output signal; and substantially simultaneously processing the I-channel output signal and the Q-channel output signal to by a control circuit processing power-spectral-density (PSD) measurements using the I-channel output signal and the Q-channel output signal as a function of frequency to determine estimation values for both a distance to the target and a velocity of the target.

15. The method of claim 14, wherein the optical splitter comprises an optical power tap configured to optically split the frequency modulated laser beam into the local laser beam and the target laser beam.

16. The method of claim 14, wherein the optical splitter comprises an optical circulator, the method further comprising:

delivering, by the optical circulator, the target laser beam to the beam steering module;

receiving, by the optical circulator, the target laser beam reflected by a target from the beam steering module; and delivering, by the optical circulator, the reflected target laser beam to the coherent receiver.

17. The method of claim 14, wherein the photonics assembly comprises an integrated photonic chip.

18. The method of claim 14, wherein the photonics assembly further comprises the beam steering module.

19. The method of claim 18, wherein the beam steering module further comprises a beam scanner an optical lens system, the method further comprising:

receiving, by the optical lens system, the target laser beam from the optical splitter;

projecting, by the optical lens system, the target laser beam to the beam scanner, receiving, by the optical lens system, the reflected target laser beam from the beam scanner; and directing, by the optical lens system, the reflected target laser beam to the optical splitter.

20. The method of claim 14, wherein the optical system comprises a first optical system, the frequency modulated laser beam comprises a first frequency modulated laser beam, the optical splitter comprises a first optical splitter, and the coherent receiver comprises a first coherent receiver, the method further comprising:

receiving, by a second optical system, a second frequency modulated laser beam simultaneously as the first frequency modulated laser beam is received by the first optical system;

optically splitting, by a optical splitter, the second frequency modulated laser beam into a second local laser beam and a second target laser beam;

delivering, by the optical splitter, the second target laser beam to the beam steering module;

receiving, by the optical splitter, the second target laser beam reflected by a target from the beam steering module;

receiving, by a second coherent receiver, the second local laser beam from the second optical splitter, receiving, by the second coherent receiver, the reflected second target laser beam from the second optical splitter; and mixing, by the second coherent receiver, the second local laser beam and the second target laser beam to produce a second output signal.

21. The method of claim 20, wherein the photonics assembly further comprises the beam steering module.

22. The method of claim 21, wherein the beam steering module further comprises a beam scanner and an optical lens system, the method further comprising:

receiving, by the optical lens system, the first target laser beam and the second target laser beam from each of the first optical splitter and the second optical splitter;

projecting, by the optical lens system, the first target laser beam and the second target laser beam to the beam scanner;

receiving, by the optical lens system, the reflected first target laser beam and the reflected second target laser beam from the beam scanner; and directing, by the optical lens system, the reflected first target laser beam and the reflected second target laser beam to the first optical splitter and the second optical splitter, respectively.

23. The method of claim 21, wherein the beam steering module further comprises a first beam scanner, a first optical lens system, a second beam scanner, and a second optical lens system, the method further comprising:

receiving, by the first optical lens system, the first target laser beam from the first optical splitter;

projecting, by the first optical lens system, the first target laser beam to the first beam scanner;

receiving, by the first optical lens system, the reflected first target laser beam from the first beam scanner;

directing, by the first optical lens system, the reflected first target laser beam to the first optical splitter;

receiving, by the second optical lens system, the second target laser beam from the second optical splitter;

projecting, by the second optical lens system, the second target laser beam to the second beam scanner;

receiving, by the second optical lens system, the reflected second target laser beam from the second beam scanner; and directing, by the second optical lens system, the reflected second target laser beam to the second optical splitter.

24. The method of claim 14, wherein the PSD measurements include a first peak value at a first frequency value and a second peak value at a second frequency value, and the method comprises the control circuit determining a nominal beat frequency based on a difference between the first frequency value and the second frequency value, and determining the distance to the target based on the nominal beat frequency.

25. The method of claim 14, wherein the coherent receiver comprises an optical hybrid.

26. The method of claim 14, wherein the coherent receiver comprises a pair of balanced photodiodes configured to output the output signal.

* * * * *